United States Patent [19]

Bohemen

[11] 4,162,999

[45] Jul. 31, 1979

[54] BLENDS CONTAINING ELASTOMERS

[75] Inventor: John Bohemen, Leatherhead, England

[73] Assignee: The British Petroleum Company Limited, London, England

[21] Appl. No.: 875,435

[22] Filed: Feb. 6, 1978

Related U.S. Application Data

[63] Continuation-in-part of Ser. No. 873,550, Jan. 30, 1978, abandoned.

[51] Int. Cl.² ............... C08L 91/00; C08F 14/02; C08C 19/20
[52] U.S. Cl. .................. 260/28.5 B; 260/28.5 D; 260/28.5 AS
[58] Field of Search ............ 260/28.5 B, 28.5 D, 260/29.5 AS

[56] References Cited

U.S. PATENT DOCUMENTS

| | | | |
|---|---|---|---|
| 4,036,799 | 7/1977 | Westermann | 260/28.5 B |
| 4,080,350 | 3/1978 | Briscoe et al. | 260/28.5 B |
| 4,100,123 | 7/1978 | Westermann | 260/28.5 B |

*Primary Examiner*—Morton Foelak
*Attorney, Agent, or Firm*—Brooks, Haidt, Haffner & Delahunty

[57] ABSTRACT

A blend of chlorine-containing synthetic elastomer and hardened extract, contains an aliphatic amine having 8 to 24 carbon atoms in the molecule. The presence of the amine is beneficial when making sheets between rollers at moderately elevated temperatures.

14 Claims, No Drawings

BLENDS CONTAINING ELASTOMERS

This application is a continuation-in-part of application Ser. No. 873,550 filed on Jan. 30, 1978 and now abandoned.

The present invention relates to improved elastomer compositions, the process for forming such compositions into articles, and to the articles obtained from the compositions.

Blends of certain elastomers with a material known as "hardened extract" (the nature of which is defined below) are less expensive than the polymers themselves but still retain useful properties. In particular these blends have properties which make them particularly suitable for use in the form of membranes or sheets for example for water-proofing purposes. The most convenient method of forming sheets from these compositions is to form the sheets between rollers for example as in calendering or as in roller die extrusion. However considerable problems have arisen when attempting to use these compositions for the purpose of forming sheets between rollers. The sheets can be formed between rollers at relatively low temperatures but the sheet shrinks when it is removed from the rollers and allowed to cool to ambient temperature, giving rise to undesirable wrinkling of the sheet. Shrinkage also occurs when the sheet is reheated, e.g. in bonding together with hot bitumen. The problem of shrinking can be overcome by carrying out the forming between rollers at a higher temperature. However when higher temperatures are used it is found that there is a tendency for the material being subjected to the forming operation to stick to the rollers so that a satisfactory sheet cannot be obtained. The composition may stick to the rollers even though the same composition can be satisfactorily compression moulded at much higher temperatures without sticking to the mould. These difficulties with forming between rollers still persist even when a variety of lubricating materials or conventional release agents are added to the composition with the object of reducing the adhesion of the composition to the rollers. The application of a silicone release agent to the rollers is also ineffective.

It is known that certain long chain aliphatic amines may be used as mould release agents in the production of hard rubber articles. It is disclosed in Netherlands patent specification No. 7510513 that aliphatic amines may be added to moulding compositions consisting of bitumen and ethylene/vinyl ester copolymers to prevent the sticking together of articles made from the compositions. This sticking together results from the exudation of oil from the moulded article.

However the "hardened extract" used in the blends of the present invention differs from bitumen in a number of important respects. In particular there is no problem with the exudation of oil from compositions containing hardened extract. There is no serious problem resulting from moulded articles made from the blends sticking together. Furthermore there is no problem in compression moulding the blends as opposed to forming the blend into sheets between rollers.

It has now been found that although there is nothing in the prior art which would lead the man skilled in the art to believe that long chain aliphatic amines would be any more effective than other lubricating or release agents, the problems which have arisen in the production of sheets from the elastomer/hardened extract blends can be avoided or considerably reduced by their use.

According to the present invention there is provided a composition which comprises a blend of a chlorine-containing synthetic elastomer and hardened extract (as hereinafter defined), the hardened extract having a saturated hydrocarbon content of not more than 10% wt/wt, and an aliphatic amine containing 8 to 24 carbon atoms in the molecule.

According to a further aspect of the present invention there is provided a process wherein a sheet is formed between rollers from a composition comprising a blend of chlorine-containing synthetic elastomer and hardened extract (as hereinafter defined), the hardened extract having a saturated hydrocarbon content of not more than 10% wt/wt, and an aliphatic amine containing 8 to 24 carbon atoms in the molecule.

Chlorine-Containing Elastomer

Examples of suitable chlorine-containing elastomers are chlorosulphonated polyethylene, chlorinated polyethylene, and polychloroprene.

Chlorosulphonated polyethylene elastomers are made by treating polyethylene with chlorine and sulphur dioxide to give a product containing —Cl and —SO$_2$Cl groups. Chlorosulphonated polyethylene elastomers are commercially available under the trade name "Hypalon" from E. I. DuPont de Nemours & Co. Inc. Information on these polymers is given in Volume 7 page 6 line 5 of "Encyclopedia of Chemical Technology" edited by Kirk-Othmer Second Edition.

Chlorinated polyethylene elastomers are made by treating polyethylene with chlorine. The chlorinated polyethylene may for example have a chlorine content of from 20 to 48% by weight.

It is preferred to use chlorinated polyethylene based on high density polyethylene having chlorine contents of from 25 to 40% by weight chlorine. Particularly preferred are chlorinated polyethylene CPE 2552 and CPE 3614 which contain 25% and 36% by weight chlorine respectively and which are manufactured by Dow Chemical Company.

Polychloroprene elastomers may be homopolymers but may optionally contain units derived from a comonomer. Thus comonomers such as styrene or 2,3-dichlorobutadiene may be used to modify such polymer properties as rate of crystallisation. The quantity of comonomer used preferably is not more than 50% by weight of the total monomeric material, or preferably not more than 10% by weight of the monomeric material. The polychloroprene used in the process of the present invention may be any polychloroprene capable of being vulcanised. It may be a sulphur modified polychloroprene, or a polychloroprene made using a mercaptan modifier, e.g. dodecyl-mercaptan, or a dialkyl xanthogen disulphide e.g. diethyl xanthogen disulphide.

The Mooney viscosity of the polychloroprene may vary over a moderately wide range for example 15 to 75. The Mooney viscosity may typically be in the range 45–55.

The Hardened Extract

Throughout this specification 'hardened extract' means a material obtained by blowing a gas containing free oxygen into a petroleum extract at elevated temperatures, the petroleum extract having been obtained by the solvent extraction of a product of petroleum refining which is a distillate petroleum fraction or a deasphalted petroleum residue or of a blend of this deasphalted residue and distillate, which product boils above 350° C. at atmospheric pressure and which contains a major proportion of aromatic hydrocarbons.

The product of petroleum refining subjected to solvent extraction may be for example a vacuum distillate obtained by vacuum distillation of a residue from an atmospheric pressure distillation. Alternatively the product of petroleum refining may be obtained from vacuum residue (the residue of the vacuum distillation referred to above) after asphaltenes have been removed by precipitation with liquid propane. The solvent extraction to give a product containing a major proportion of aromatic hydrocarbons may be carried out on mixtures of distillates and residues.

The product of petroleum refining from which the petroleum extract is obtained is preferably a vacuum distillate boiling in the lubricating oil range e.g. at a temperature in the range 350° C. to 600° C. Such vacuum distillates are well known to those skilled in the art.

The elevated temperature at which the gas containing free oxygen e.g. air is blown into the petroleum extract may for example be 250° C. to 350° C.

Examples of solvents which may be used to extract the distillate petroleum fraction are furfural, phenol and N-methyl pyrrolidone. The product subjected to extraction is substantially free from asphaltenes, and this extraction process must be distinguished from the use of, for example, liquid propane to obtain a product rich in asphaltenes from residues, which is sometimes described as a 'solvent' process.

Examples of such petroleum extracts are materials sold under the designation 'Enerflex' Process Oils by BP Oil Limited, London. Particular examples of petroleum extracts suitable for air blowing are Enerflex 65 and Enerflex 96 particularly Enerflex 96. It is preferred that the hardened extract is prepared from a petroleum extract having a content of 'saturates' and 'aromatics' as determined by molecular-type analysis (clay-gel) ASTM D2007, of less than 15% by weight more preferably less than 10% by weight for saturates and preferably greater than 75% by weight, more preferably greater than 80% by weight for aromatics.

The 'hardened extract' resulting from the air blowing referred to above is a solid material at room temperature. In order to obtain a hardened extract having the desired low content of saturated hydrocarbon it may be necessary to select a petroleum extract in which the saturated hydrocarbon content is low. The choice of a suitable petroleum extract can readily be made by the man skilled in the art on the basis of simple tests. The blowing with air may be carried out in the presence of a catalyst e.g. a metal halide Friedel-Crafts catalyst such as ferric chloride, or without a catalyst.

The hardened extracts used in the present invention are to be distinguished from bitumens by the fact that they are made by a process which involves the production of a product which is substantially free of asphaltenes by either distillation or by de-asphalting a residue, followed by a solvent extraction, the asphaltenes only being introduced by the blowing with gas containing free oxygen. When crude oil is distilled to remove materials boiling up to the end of the gas oil range, the resulting residue, known as atmospheric residue, can be subjected to vacuum distillation to recover waxy distillates. The residue from this vacuum distillation is known as vacuum residue. The bitumen may be obtained directly from this residue or the residue may be air blown to produce a low penetration bitumen. Alternatively residue (either atmospheric or vacuum may be treated with for example liquid propane to precipitate a bitumen layer. In all these cases the asphaltenes in the bitumen comes directly from the residue, and there is no intermediate formation of an intermediate material substantially free of asphaltenes.

The composition of hardened extracts and bitumens may be determined on the basis of their content of certain classes of material, namely 'asphaltenes', 'toluene insolubles', 'saturates', 'cyclics' and 'resins'. In this method asphaltenes are defined as that fraction which is precipitated by a large excess of n-heptane but which is soluble in toluene. Toluene insolubles are that fraction which is insoluble in toluene. Saturates are defined as that fraction which is eluted by n-heptane from an alumina/silica gel column, cyclics at that fraction which is eluted by toluene, and resins as that fraction which is eluted by a 50/50 toluene/absolute ethanol mixture.

Typical data on hardened extracts and bitumens are given in Table 1 where "HE" means 'hardened extract' and the number following "HE" is the softening point.

It will be seen that the hardened extracts have much lower saturated hydrocarbon contents and higher asphaltenes and insolubles contents than either straight run or blown bitumens of equivalent softening point. Preferably the hardened extracts used have asphaltene plus insolubles contents of at least 20% by weight and saturates content of less than 10% by weight. Preferably the content of asphaltenes alone is at least 20% by weight.

Hardened extracts are available having a range of softening points. Thus hardened extracts having softening points ranging from 50° C. to 200° C. may be used. It is preferred to use hardened extracts having a softening point in the range of 85°–170° C. The softening point of hardened extract is measured by the ring and ball test used to determine the softening point of bitumens. This is described in Chapter 13 page 12 of "Petroleum Products Handbook" edited by Guthrie and published in 1960 by McGraw Hill.

TABLE I

| Broad Chemical Composition of Blown Bitumen and Hardened Extracts | | | | | |
|---|---|---|---|---|---|
| | 115/15 Blown Kuwait Bitumen | 85/25 Straight run Bitumen | HE 100 | HE 120 | HE 150 |
| Softening Point Ring and Ball °C. | 115 | 85 | 100 | 120 | 150 |
| Penetration at 25° C. mm/10 | 15 | 25 | <1 | <1 | <1 |
| BCC Analysis % | | | | | |
| Saturates | 18.1 | 10.0 | 2.0 | 1.6 | 0.8 |

TABLE I-continued
Broad Chemical Composition of Blown Bitumen and Hardened Extracts

|  | 115/15 Blown Kuwait Bitumen | 85/25 Straight run Bitumen | HE 100 | HE 120 | HE 150 |
|---|---|---|---|---|---|
| Cyclics | 33.2 | 55.3 | 46.0 | 41.0 | 34.0 |
| Asphaltenes | 32.5 | 7.1 | 25.0 | 48.0 | 20.0 |
| Resins | 14.9 | 26.1 | 17.0 | 16.0 | 13.0 |
| Toluene Insolubles | 2.1 | 1.5 | 11.0 | 17.0 | 34.0 |

The Amine

The amines used in the compositions of the present invention are aliphatic amines having 8 to 24 carbon atoms in the molecule. It is preferred to use amines having 12 to 20 carbon atoms in the molecule. The amine may have a straight or branched chain and may be used singly or as mixtures. The amines are preferably primary amines. An example of a suitable amine is the material sold under the name "Armeen 18D" by Armour Hess Chemicals Limited, and which is a mixture of 12.5% by weight of palmityl amine (a $C_{16}$ amine) 2% by weight of margaryl amine (a $C_{17}$ amine) and 85% by weight of stearyl amine (a $C_{18}$ amine).

Optional Additional Ingredients

The compositions of the present invention may also contain fillers that are commonly used in reinforcing rubber e.g. calcium carbonate, carbon black, titanium dioxide, clay etc. The use of these fillers can improve tear strength of the blend. Fibrous fillers such as asbestos, cotton, polyester fibres, rayon fibres etc., may also be used.

The compositions of the present invention may also contain certain plasticizers providing these are compatible with the composition i.e. do not readily separate from the composition after being mixed with it. Examples of such plasticizers are aromatic extracts (this being the material from which hardened extract is prepared), chlorinated paraffins for example those having from 12 to 30 carbon atoms in the molecule, and esters for example di-2-ethylhexyl phthalate.

Vulcanisation

Some of the compositions according to the invention are satisfactory without vulcanisation. If additional strength is required in the membranes formed from the compositions of the present invention, vulcanising agents may be incorporated in the compositions and the membranes subjected to vulcanisation by heating. Where a sheet or membrane is to be formed between rollers from a composition containing a vulcanisation agent which vulcanises the composition when heated it is preferred to add the vulcanising agent at a late stage in the preparation of the composition on for example a Banbury mixer to avoid premature vulcanisation. The vulcanisation step can be carried out by heating the sheet formed between rollers to a temperature greater than that used in the roller forming step and which is sufficient to cause vulcanisation. Suitable vulcanisation agents for different rubbers are well known.

Compositions containing chlorosulphonated polyethylene usually give products with good properties without vulcanisation. However polybasic metal oxides may be incorporated in such compositions to produce a slow vulcanisation at ambient temperatures in the presence of water.

Relative Quantities of Ingredients

The relative weights of chlorine containing synthetic elastomer and hardened extract used in the compositions of the present invention may vary over a wide range but preferably the weight of hardened extract present is not more than 300% of the total weight of elastomer, more preferably not more than 200%, and is preferably not less than 75% of the total weight of elastomer, more preferably not less than 100% of the total weight of elastomer.

The quantity of aliphatic amine present may for example be 0.03 to 3% wt/wt, based on weight of total composition, preferably 0.1 to 1% wt/wt.

The quantity of solid filler, if present is preferably in the range 1 to 250, more preferably 10 to 150, parts per hundred parts chlorine-containing synthetic elastomer.

The quantity of plasticizer, if present, is preferably in the range 1 to 50, more preferably 5 to 25, parts per hundred parts chlorosulphonated polyethylene and chlorinated polyethylene.

The quantity of fibrous filler, if present is preferably in the range 1 to 50, more preferably 5 to 25, parts per hundred parts chlorine-containing synthetic elastomer.

The quantity of vulcanisation agent, if used, will be selected so as to give the desired degree of vulcanisation and the optimum amounts can be readily determined by those skilled in the art.

Preparation of the Compositions

The compositions of the present invention may be prepared by any convenient method. Thus any of the methods used in compounding rubbers may be used e.g. Banbury mixer, 2 roll mill etc.

Production of Sheets

The compositions of the present invention are particularly suitable for the production of sheets by forming between rollers. The process in which the sheet is formed between rollers may for example be calendering. Alternatively the sheets may be formed between rollers by using the process of roller-die extrusion. The processess of calendering and roller-die extrusion are well known in the art. The sheets are formed between rollers at a temperature above 90° C., because at lower temperatures there is a problem with shrinkage of the sheet on cooling to ambient temperatures. It is preferred to avoid the use of temperatures in excess of the softening point of the hardened extract used, e.g., for hardened extract with a softening point of 150° C. it is preferred to use a temperature of not more than 150° C.

The invention will now be illustrated by reference to the following Examples.

The basic formulation used for these examples was chlorosulphonated polyethylene (Hypalon 45) 50 parts, chlorinated polyethylene (CPE 3614) 50 parts, hardened extract (HE 120) 150 parts, (ex BP Oil Limited).

The complete recipes and details of their processing are given in Table 1. All temperatures are in degrees Celsius.

Preparation

Example 3 and Test B were prepared in a size 'B' Banbury mixer of charge size 1.1 kg. The rubber and amine (or amide) were mixed for 2 minutes at up to 100°. The hardened extract was added and mixed at up to 135° for a further 10 minutes. The mix was dumped (i.e. removed from the mixer) at about 135° and the dumping behaviour graded.

The other eight examples were mixed in a Brabender Plasticorder, charge size 65 g., at a speed of 60 rpm for 1 hour. The maximum temperature of the mix was 130°. Dumping was graded as above.

All mixes were milled 10 times on a cold mill to a rough sheet.

Processing Assessment

A qualitative test to assess the processing characteristics of each mix was then carried out as follows. A 20 g sample of the mix was milled on a small 2-roll mill at various temperatures. The maximum temperature that a good sheet could be obtained i.e. minimal sticking to the rollers, was recorded (error ±5°). The shrinkage along the milled direction was then recorded after cooling the sheet to room temperature (error ±10%). It was found that the higher the temperature that the material could be milled the less the shrinkage and the better the processing characteristics.

Experiments

Examples 1, 2, 3, 4, 5, 6 and 7 are according to the invention. Tests A, B and C are comparative examples not according to the invention.

Test A shows that the basic formulation with no additives processed poorly and a good sheet could not be obtained above 55° C.

Examples 1, 2 and 3 show that the addition of increasing amounts of octadecylamine ($C_{18}$) gradually improved processability and when 1 part was added a sheet could be obtained at 80° C.

Example 4 shows that the addition of 1 part of armeen 18D to the basic formulation allowed a sheet to be obtained at 95° with shrinkage of only 5%.

Test B shows that the addition of 1 part of stearamide ($C_{18}$), a process aid did not improve the processability of the basic mix in Example 1.

Examples 5 and 6 show that octadecylamine, a $C_{18}$ amine, is more effective in improving processing properties than laurylamine a $C_{12}$ amine.

Test C shows that the addition of 15 parts of Microwax 65, a lubricant gave a mix of inferior processing properties to Example 1.

TABLE 2

| Basic Formulation: | Parts |
|---|---|
| Hard Extract 120 | 150 |
| CPE 3614 | 50 |
| Hypalon 45 | 50 |

| Experiment | Octadecylamine | "Armeen" 18D | Laurylamine | Stearamide | Microwax 65 | MT Black | 1/4" Rayon Fibres | Cure* System | Dumping | Max Temp for Sheet Formation °C. | Shrinkage along milled direction % |
|---|---|---|---|---|---|---|---|---|---|---|---|
| A | | | | | | | | | Poor | 55 | 50 |
| 1 | 0.25 | | | | | | | | Good | 60 | 30 |
| 2 | 0.5 | | | | | | | | Good | 70 | 25 |
| 3 | 1.0 | | | | | | | | Very Good | 80 | 20 |
| 4 | | 1.0 | | | | | | | Very Good | 95 | 5 |
| B | | | | 1.0 | | | | | Poor | 50 | 50 |
| 5 | 2.0 | | | 0.5 | | | | A | Very Good | 90 | 10 |
| 6 | | | 2.0 | 0.5 | | | | A | Good | 60 | 25 |
| C | | | | | 15 | | | B | Poor | 35 | 50 |
| 7 | 1.0 | | | | | 30 | 10 | | Very Good | 105 | 0 |

*Cure Systems
A PbO 5 Parts
B PbO 5 Parts MBTS 0.25 parts "Robac P25" 0.25 parts
"Robac P25" is dipentamethylene thiuram tetra sulphide
"MBTS" is dibenzthiazyl disulphide.

Example 7 shows that a sheet with no shrinkage could be obtained with a mix containing 1 part of amine, 30 parts of carbon black and 10 parts of 1/4" rayon fibre.

The processing characteristics of each mix are illustrated in Table 2.

I claim:

1. A composition which comprises a blend of a chlorine-containing synthetic elastomer and a hardened extract having a saturated hydrocarbon content of not more than 10% w/w and obtained by blowing a gas containing free oxygen into a petroleum extract at elevated temperatures, the petroleum extract having been obtained by the solvent extraction of a product of petroleum refining which is a distillate petroleum fraction or a deasphalted petroleum residue or a blend of this deasphalted residue and distillate, which product boils above 350° C. at atmospheric pressure and which contains a major proportion of aromatic hydrocarbons, characterized in that the composition contains about at least 0.03% by weight, based on the total composition, of an aliphatic amine containing 8 to 24 carbon atoms in the molecule.

2. A composition according to claim 1 containing chlorosulphonated polyethylene.

3. A composition according to either of claims 1 or 2 wherein the composition contains chlorinated polyethylene.

4. A composition according to claim 3 wherein the chlorinated polyethylene is a chlorinated high density polyethylene having a chlorine content of from 25 to 40% by weight chlorine.

5. A composition according to claims 1 wherein the hardened extract has a softening point in the range 50° C. to 200° C.

6. A composition according to claim 5 wherein the hardened extract has a softening point in the range 85° to 170° C.

7. A composition according to claim 1 wherein the hardened extract has a content of asphaltenes and insolubles of at least 20% by weight.

8. A composition according to claim 7 wherein the content of asphaltenes alone is at least 20% by weight.

9. A composition according to claim 1 wherein the aliphatic amine has 12 to 20 carbon atoms in the molecule.

10. A composition according to claim 8 wherein the amine is a primary amine.

11. A composition according to claim 1 wherein the weight of hardened extract present is not more than 300% by weight of the total weight of elastomer.

12. A composition according to claim 11 wherein the weight of hardended extract is not more than 200% by weight of the total weight of elastomer.

13. A composition according to claim 1 wherein the quantity of aliphatic amine is from 0.03 to 3% by weight based on the weight of total composition.

14. A composition according to claim 13 wherein the quantity of aliphatic amine is 0.1 to 1% by weight, based on the weight of total composition.

* * * * *